(12) United States Patent  
Gao et al.

(10) Patent No.: US 8,150,000 B2
(45) Date of Patent: *Apr. 3, 2012

(54) VOICE MAIL NOTIFICATION USING INSTANT MESSAGING

(75) Inventors: Xiaofeng Gao, Alpharetta, GA (US); Maria Adamczyk, Alpharetta, GA (US); Karen Mullis, Loganville, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1150 days.

This patent is subject to a terminal disclaimer.

(21) Appl. No.: 11/938,522

(22) Filed: Nov. 12, 2007

(65) Prior Publication Data

US 2008/0304634 A1 Dec. 11, 2008

Related U.S. Application Data

(63) Continuation of application No. 10/759,165, filed on Jan. 20, 2004, now Pat. No. 7,369,647, which is a continuation of application No. 10/232,749, filed on Sep. 3, 2002, now Pat. No. 6,707,890.

(51) Int. Cl.
*H04M 1/64* (2006.01)
*H04M 11/10* (2006.01)

(52) U.S. Cl. ............ 379/88.02; 370/352; 370/353; 370/401; 379/88.17; 379/88.19; 379/207.06; 379/210.01; 379/215.01; 380/250; 455/412.1; 455/413; 455/414.1; 455/439; 455/466; 463/42; 709/206; 709/224

(58) Field of Classification Search ............ 379/88.12, 379/88.17, 88.22, 88.19, 207.06, 210.01, 379/215.01; 380/250; 709/206, 224; 370/352, 370/353, 401; 455/412.1, 412.2, 413, 414.1, 455/435.1, 439, 466; 463/42
See application file for complete search history.

(56) References Cited

U.S. PATENT DOCUMENTS

| 4,625,081 A | 11/1986 | Lotito et al. |
| 4,930,152 A | 5/1990 | Miller |
| 4,933,967 A | 6/1990 | Lo et al. |
| 4,951,044 A | 8/1990 | Nelson et al. |
| 5,058,152 A | 10/1991 | Solomon et al. |
| 5,313,515 A | 5/1994 | Allen et al. |

(Continued)

FOREIGN PATENT DOCUMENTS

EP 0255325 2/1988

(Continued)

OTHER PUBLICATIONS

Gao; Notice of Allowance and Fees Due mailed Nov. 15, 2007; U.S. Appl. No. 10/759,165, filed Jan. 20, 2004.

(Continued)

*Primary Examiner* — Gerald Gauthier

(74) *Attorney, Agent, or Firm* — Thomas, Kayden, Horstemeyer & Risley, LLP

(57) ABSTRACT

A system and method that notifies a voice mailbox subscriber of the receipt of a message at a voicemail server using instant messaging. A preferred embodiment of the invention includes an enhanced notification server that receives a notification of the message from the voicemail server, queries the availability of an instant messaging client via an instant messaging presence server, and forwards the notification to the instant messaging client via the instant messaging presence server if the instant messaging client is available. In preferred embodiments, provisions are made to forward the message to the subscriber via instant messaging.

7 Claims, 6 Drawing Sheets

U.S. PATENT DOCUMENTS

| | | |
|---|---|---|
| 5,353,331 A | 10/1994 | Emery et al. |
| 5,361,295 A | 11/1994 | Solomon et al. |
| 5,425,091 A | 6/1995 | Josephs |
| 5,493,607 A | 2/1996 | Arumainayagam et al. |
| 5,521,969 A | 5/1996 | Paulus et al. |
| 5,559,800 A | 9/1996 | Mousseau et al. |
| 5,572,578 A | 11/1996 | Lin et al. |
| 5,572,583 A | 11/1996 | Wheeler, Jr. et al. |
| 5,631,948 A | 5/1997 | Bartholomew et al. |
| 5,680,442 A | 10/1997 | Bartholomew et al. |
| 5,680,444 A | 10/1997 | Reeves |
| 5,684,862 A | 11/1997 | Finnigan |
| 5,687,220 A | 11/1997 | Finnigan |
| 5,692,033 A | 11/1997 | Farris |
| 5,712,903 A | 1/1998 | Bartholomew et al. |
| 5,717,742 A | 2/1998 | Hyde-Thomson |
| 5,740,230 A | 4/1998 | Vaudreuil |
| 5,740,231 A | 4/1998 | Cohn et al. |
| 5,742,668 A | 4/1998 | Pepe et al. |
| 5,742,763 A | 4/1998 | Jones |
| 5,742,769 A | 4/1998 | Lee et al. |
| 5,742,905 A | 4/1998 | Pepe et al. |
| 5,748,709 A | 5/1998 | Sheerin |
| 5,764,747 A | 6/1998 | Yue et al. |
| 5,768,348 A | 6/1998 | Solomon et al. |
| 5,790,637 A | 8/1998 | Johnson et al. |
| 5,797,124 A | 8/1998 | Walsh |
| 5,802,466 A | 9/1998 | Gallant et al. |
| 5,812,639 A | 9/1998 | Bartholomew et al. |
| 5,812,670 A | 9/1998 | Micali |
| 5,832,072 A | 11/1998 | Rozenblit |
| 5,832,221 A | 11/1998 | Jones |
| 5,838,768 A | 11/1998 | Sumar et al. |
| 5,848,132 A | 12/1998 | Morley et al. |
| 5,884,160 A | 3/1999 | Kanazaki |
| 5,892,814 A | 4/1999 | Brisebois |
| 5,905,774 A | 5/1999 | Tatchell et al. |
| 5,930,479 A | 7/1999 | Hall |
| 5,940,478 A | 8/1999 | Vaudreuil et al. |
| 5,940,740 A | 8/1999 | Aas et al. |
| 5,963,626 A | 10/1999 | Nabkel |
| 5,987,317 A | 11/1999 | Venturini |
| 5,999,595 A | 12/1999 | Shaffer et al. |
| 6,002,751 A | 12/1999 | Shaffer |
| 6,005,845 A | 12/1999 | Svennesson et al. |
| 6,005,922 A | 12/1999 | Longster et al. |
| 6,006,087 A | 12/1999 | Amin |
| 6,049,713 A | 4/2000 | Tran |
| 6,061,432 A | 5/2000 | Wallace et al. |
| 6,064,723 A | 5/2000 | Cohn et al. |
| 6,064,876 A | 5/2000 | Ishida et al. |
| 6,069,890 A | 5/2000 | White et al. |
| 6,078,650 A | 6/2000 | Hansen |
| 6,091,947 A | 7/2000 | Sumner |
| 6,097,941 A | 8/2000 | Helferich |
| 6,122,348 A | 9/2000 | French-St. George et al. |
| 6,148,069 A | 11/2000 | Ekstrom et al. |
| 6,169,795 B1 | 1/2001 | Dunn et al. |
| 6,181,780 B1 | 1/2001 | Finnigan |
| 6,181,781 B1 | 1/2001 | Porter |
| 6,209,100 B1 | 3/2001 | Robertson et al. |
| 6,219,694 B1 | 4/2001 | Lazaridis et al. |
| 6,226,359 B1 | 5/2001 | Montgomery et al. |
| 6,226,362 B1 | 5/2001 | Gerszberg |
| 6,233,318 B1 | 5/2001 | Picard et al. |
| 6,233,430 B1 | 5/2001 | Helferich |
| 6,243,374 B1 | 6/2001 | White et al. |
| 6,259,892 B1 | 7/2001 | Helferich |
| 6,292,799 B1 | 9/2001 | Peek et al. |
| 6,301,349 B1 | 10/2001 | Malik |
| 6,301,608 B1 | 10/2001 | Rochkind |
| 6,317,484 B1 | 11/2001 | McAllister |
| 6,330,079 B1 | 12/2001 | Dugan et al. |
| 6,332,020 B1 | 12/2001 | Mitchell |
| 6,333,973 B1 | 12/2001 | Smith |
| 6,339,640 B1 | 1/2002 | Chen et al. |
| 6,351,523 B1 | 2/2002 | Detlef |
| 6,366,651 B1 | 4/2002 | Griffith |
| 6,389,276 B1 | 5/2002 | Brilla et al. |
| 6,393,908 B1 | 5/2002 | Swain et al. |
| 6,396,908 B1 | 5/2002 | O'Donovan et al. |
| 6,408,176 B1 | 6/2002 | Urs |
| 6,418,200 B1 | 7/2002 | Ciccolella et al. |
| 6,459,774 B1 | 10/2002 | Ball |
| 6,459,785 B1 | 10/2002 | Naumburger |
| 6,487,277 B2 | 11/2002 | Beyda |
| 6,507,643 B1 | 1/2003 | Groner |
| 6,522,879 B2 | 2/2003 | Myer |
| 6,529,586 B1 | 3/2003 | Elvins |
| 6,529,602 B1 | 3/2003 | Walker |
| 6,580,784 B2 | 6/2003 | Rodriguez |
| 6,621,892 B1 | 9/2003 | Banister |
| 6,625,258 B1 | 9/2003 | Ram |
| 6,654,601 B2 | 11/2003 | Picoult et al. |
| 6,683,940 B2 | 1/2004 | Contractor |
| 6,697,459 B2 | 2/2004 | Finnigan |
| 6,707,890 B1* | 3/2004 | Gao et al. .................. 379/88.12 |
| 6,718,015 B1 | 4/2004 | Berstis |
| 6,721,397 B1 | 4/2004 | Lu |
| 6,728,934 B1 | 4/2004 | Scopes |
| 6,744,867 B1 | 6/2004 | Chin |
| 6,771,949 B1* | 8/2004 | Corliss .......................... 455/413 |
| 6,782,081 B2 | 8/2004 | Malik |
| 6,792,093 B2 | 9/2004 | Barak |
| 6,795,530 B1 | 9/2004 | Gilbert |
| 6,801,763 B2 | 10/2004 | Elsey |
| 6,807,257 B1 | 10/2004 | Kurganov |
| 6,829,334 B1 | 12/2004 | Zirngibl |
| 6,850,609 B1 | 2/2005 | Schrage |
| 6,865,384 B2 | 3/2005 | Sagi et al. |
| 6,868,142 B2 | 3/2005 | Gupta |
| 6,882,708 B1 | 4/2005 | Bedingfield et al. |
| 6,888,930 B1 | 5/2005 | Hartselle |
| 6,891,934 B1* | 5/2005 | Gao et al. .................. 379/88.17 |
| 6,940,958 B2 | 9/2005 | Clapper |
| 6,981,223 B2 | 12/2005 | Becker et al. |
| 6,987,841 B1 | 1/2006 | Byers |
| 6,990,180 B2 | 1/2006 | Vuori |
| 6,996,212 B1 | 2/2006 | Baker |
| 6,999,565 B1 | 2/2006 | Delaney et al. |
| 7,035,382 B1* | 4/2006 | Shin et al. .................. 379/88.12 |
| 7,046,772 B1 | 5/2006 | Moore |
| 7,050,792 B2 | 5/2006 | Chou |
| 7,072,452 B1 | 7/2006 | Roberts |
| 7,142,646 B2 | 11/2006 | Zafar et al. |
| 7,167,546 B2 | 1/2007 | Moore |
| 7,167,701 B1 | 1/2007 | Jordan |
| 7,190,950 B1 | 3/2007 | Baker |
| 7,283,808 B2* | 10/2007 | Castell et al. .................. 455/413 |
| 7,353,015 B1* | 4/2008 | Tenhunen .................. 455/412.2 |
| 7,369,647 B2* | 5/2008 | Gao et al. .................. 379/88.12 |
| 7,400,713 B2* | 7/2008 | Gao et al. .................. 379/88.12 |
| 7,646,856 B2 | 1/2010 | Bedingfield et al. |
| 7,844,055 B2* | 11/2010 | Mukherjee et al. ........... 380/250 |
| 7,933,390 B2 | 4/2011 | Bedingfield et al. |
| 2001/0027097 A1 | 10/2001 | I'Anson |
| 2001/0033639 A1 | 10/2001 | Martin |
| 2001/0041590 A1 | 11/2001 | Silberfenig |
| 2001/0044297 A1 | 11/2001 | Myer et al. |
| 2001/0053206 A1 | 12/2001 | Muller |
| 2002/0031207 A1 | 3/2002 | Lin |
| 2002/0067806 A1 | 6/2002 | Rodriguez et al. |
| 2002/0069060 A1 | 6/2002 | Cannavo |
| 2002/0077082 A1 | 6/2002 | Cruickshank |
| 2002/0082046 A1 | 6/2002 | Peters |
| 2002/0087643 A1 | 7/2002 | Parsons et al. |
| 2002/0090963 A1 | 7/2002 | Avalos et al. |
| 2002/0098831 A1 | 7/2002 | Castell |
| 2002/0110226 A1 | 8/2002 | Kovales et al. |
| 2002/0147592 A1 | 10/2002 | Wilmot |
| 2002/0152071 A1 | 10/2002 | Chaiken et al. |
| 2002/0159572 A1 | 10/2002 | Fostick |
| 2002/0173306 A1 | 11/2002 | Adamany et al. |
| 2002/0173308 A1 | 11/2002 | Dorenbosch et al. |
| 2002/0181673 A1 | 12/2002 | Henry et al. |
| 2003/0002632 A1 | 1/2003 | Bhogal et al. |
| 2003/0012346 A1 | 1/2003 | Langhart |

| | | | |
|---|---|---|---|
| 2003/0018720 | A1 | 1/2003 | Chang |
| 2003/0027560 | A1 | 2/2003 | Jammal |
| 2003/0039342 | A1 | 2/2003 | Yafuso |
| 2003/0095643 | A1 | 5/2003 | Fortman et al. |
| 2003/0119486 | A1 | 6/2003 | Tari |
| 2003/0131143 | A1 | 7/2003 | Myers |
| 2003/0140090 | A1 | 7/2003 | Rezvani |
| 2003/0142799 | A1 | 7/2003 | Candell |
| 2003/0147512 | A1 | 8/2003 | Abburi |
| 2003/0169330 | A1 | 9/2003 | Ben-Shachar |
| 2003/0194990 | A1 | 10/2003 | Helferich |
| 2003/0229670 | A1 | 12/2003 | Beyda |
| 2004/0076272 | A1 | 4/2004 | Zafar et al. |
| 2004/0146144 | A1* | 7/2004 | Gao et al. .................... 379/88.12 |
| 2004/0161089 | A1 | 8/2004 | Hanson et al. |
| 2004/0203648 | A1 | 10/2004 | Wong |
| 2004/0213385 | A1 | 10/2004 | Hartselle |
| 2005/0020288 | A1 | 1/2005 | Davis et al. |
| 2005/0055411 | A1 | 3/2005 | Bouchard et al. |
| 2005/0123106 | A1* | 6/2005 | Gao et al. .................... 379/88.17 |
| 2005/0136896 | A1 | 6/2005 | Ward et al. |
| 2005/0286689 | A1 | 12/2005 | Vuori |
| 2006/0033360 | A1 | 2/2006 | Taylor |
| 2006/0083365 | A1 | 4/2006 | Baker |
| 2006/0171511 | A1 | 8/2006 | Liu |
| 2006/0183465 | A1 | 8/2006 | Helferich |
| 2006/0233327 | A1 | 10/2006 | Roberts |
| 2008/0292069 | A1* | 11/2008 | Gao et al. .................... 379/88.12 |
| 2008/0304634 | A1* | 12/2008 | Gao et al. .................... 379/88.12 |

FOREIGN PATENT DOCUMENTS

| | | |
|---|---|---|
| EP | 0412799 | 2/1991 |
| EP | 0507125 | 10/1992 |
| EP | 0543235 | 5/1993 |
| EP | 0624967 | 11/1994 |
| EP | 0662762 | 7/1995 |
| EP | 0782304 A2 | 7/1997 |
| EP | 0782315 A2 | 7/1997 |
| EP | 0782316 A2 | 7/1997 |
| EP | 0813162 A2 | 12/1997 |
| EP | 0825752 A2 | 2/1998 |
| EP | 0841796 A2 | 5/1998 |
| EP | 0843453 A2 | 5/1998 |
| EP | 0886228 A2 | 12/1998 |
| EP | 0841796 A3 | 8/1999 |
| EP | 0255325 | 6/2007 |
| WO | 9708901 | 3/1997 |

OTHER PUBLICATIONS

Bedingfield; Notice of Allowance and Fees Due mailed Nov. 23, 2007; U.S. Appl. No. 10/369,445, filed Feb. 19, 2003.
Bedingfield; Non-Final Rejection mailed Aug. 5, 2008 for U.S. Appl. No. 10/369,445, filed Feb. 19, 2003.
Bedingfield; Notice of Allowance mailed Jan. 3, 2011 for U.S. Appl. No. 11/962,583, filed Dec. 21, 2007.
Jordan, Jr.; Non-Final Office Action mailed Feb. 18, 2011 for U.S. Appl. No. 11/610,769 filed Dec. 14, 2006.
Arnoff; Interview Summary mailed Jul. 8, 2009 for U.S. Appl. No. 10/839,535, filed May 5, 2004.
Bedingfield, Non-Final Rejection mailed Jan. 21, 2009 for U.S. Appl. No. 10/369,445, filed Feb. 19, 2003.
Jordan; Non-Final Office Action mailed Jul. 6, 2010 for U.S. Appl. No. 11/610,769, filed Dec. 14, 2006.
Arnoff; U.S. Appl. No. 10/839,535, filed May 5, 2004.
Bedingfield; U.S. Appl. No. 09/513,005, filed Feb. 25, 2000.
Adamczyk; U.S. Appl. No. 10/355,931, filed Jan. 31, 2003.
Bedingfield; U.S. Appl. No. 10/369,445, filed Feb. 19, 2003.
Bedingfield: U.S. Appl. No. 11/962,583, filed Dec. 21, 2007.
Gao; U.S. Appl. No. 10/232,749, filed Sep. 3, 2002.
Gao; U.S. Appl. No. 10/759,165, filed Jan. 20, 2004.
Jordan; U.S. Appl. No. 10/097,278, filed Mar. 14, 2002.
Jordan; U.S. Appl. No. 11/028,973, filed Jan. 4, 2005.
Jordan; U.S. Appl. No. 11/610,769, filed Dec. 14, 2006.
Arnoff; Non-Final Rejection mailed Oct. 31, 2007 for U.S. Appl. No. 10/839,535, filed May 5, 2004.
Adamczyk; Examiner Interview Summary mailed Jun. 7, 2005 for U.S. Appl. No. 10/355,931, filed Jan. 31, 2003.
Adamczyk; Notice of Allowance and Fees Due mailed Jul. 11, 2007 for U.S. Appl. No. 10/355,931, filed Jan. 31, 2003.
Bedingfield; Notice of Allowance and Fees Due mailed Nov. 23, 2007 for U.S. Appl. No. 10/369,445, filed Feb. 19, 2003.
Bedingfield; Notice of Allowance and Fees Due mailed Apr. 15, 2008 for U.S. Appl. No. 10/369,445, filed Feb. 19, 2003.
Gao; Non-Final Rejection mailed Mar. 31, 2003 for U.S. Appl. No. 10/232,749, filed Sep. 3, 2002.
Gao; Final Rejection mailed Jul. 14, 2003 for U.S. Appl. No. 10/232,749, filed Sep. 3, 2002.
Gao; Non-Final Rejection mailed Sep. 22, 2005 for U.S. Appl. No. 10/759,165, filed Jan. 20, 2004.
Gao; Final Rejection mailed Feb. 27, 2006 for U.S. Appl. No. 10/759,165, filed Jan. 20, 2004.
Gao; Non-Final Rejection mailed Aug. 2, 2006 for U.S. Appl. No. 10/759,165, filed Jan. 20, 2004.
Gao; Notice of Allowance and Fees Due mailed Apr. 3, 2007 for U.S. Appl. No. 10/759,165, filed Jan. 20, 2004.
Jordan; Examiner Interview Summary mailed Mar. 14, 2005 for U.S. Appl. No. 10/097,278, filed Mar. 14, 2002.
Jordan; Examiner Interview Summary mailed Oct. 7, 2005 for U.S. Appl. No. 10/097,278, filed Mar. 14, 2002.
Jordan; Final Rejection mailed Sep. 7, 2007 for U.S. Appl. No. 11/028,973, filed Jan. 4, 2005.
Jordan; Examiner Interview Summary mailed Oct. 30, 2007 for U.S. Appl. No. 11/028,973, filed Jan. 4, 2005.
Jordan; Notice of Allowance and Fees Due mailed Feb. 8, 2008 for U.S. Appl. No. 11/028,973, filed Jan. 4, 2005.
Arnoff; Non-Final Rejection mailed Aug. 7, 2009 for U.S. Appl. No. 10/839,535, filed May 5, 2004.
Bedingfield; Non-Final Office Action mailed Aug. 27, 2010 for U.S. Appl. No. 11/962,583, filed Dec. 21, 2007.
Bedingfield; Notice of Allowance mailed Aug. 20, 2009 for U.S. Appl. No. 10/369,445, filed Feb. 19, 2003.
Eason; U.S. Appl. No. 10/109,975, filed Mar. 29, 2002.
Eason; Examiner Interview Summary mailed Mar. 31, 2006 for U.S. Appl. No. 10/109,975, filed Mar. 29, 2002.
Eason; Examiner Interview Summary mailed May 14, 2007 for U.S. Appl. No. 10/109,975, filed Mar. 29, 2002.
Eason; Examiner Interview Summary mailed Aug. 25, 2005 for U.S. Appl. No. 10/109,975, filed Mar. 29, 2002.
Eason; Final Rejection mailed Jan. 25, 2007 for U.S. Appl. No. 10/109,975, filed Mar. 29, 2002.
Eason; Final Rejection mailed Jun. 30, 2005 for U.S. Appl. No. 10/109,975, filed Mar. 29, 2002.
Eason; Final Rejection mailed Jul. 12, 2005 for U.S. Appl. No. 10/109,975, filed Mar. 29, 2002.
Eason; Non-Final Rejection mailed May 3, 2005 for U.S. Appl. No. 10/109,975, filed Mar. 29, 2002.
Eason; Non-Final Rejection mailed Jul. 14, 2006 for U.S. Appl. No. 10/109,975, filed Mar. 29, 2002.
Eason; Non-Final Rejection mailed Dec. 16, 2005 for U.S. Appl. No. 10/109,975, filed Mar. 29, 2002.
Eason; Notice of Allowance and Fees Due mailed Aug. 21, 2007 for U.S. Appl. No. 10/109,975, filed Mar. 29, 2002.
Jordan; Final Office Action mailed Oct. 18, 2010 for U.S. Appl. No. 11/610,769, filed Dec. 14, 2006.
M. Day, et al., A Model for Presence and Instant Messaging, Feb. 2000, pp. 1-17.
M. Day, et al., Instant Messaging/Presence Protocol Requirements, Feb. 2000, pp. 1-26.
An Enhanced Message Networking Topology: Multimedia Messaging with the Intuity (TM) Interchange Server, Bell Labs Technical Journal, Apr.-Jun. 1998, pp. 124-135.
Die T-Net-Box-der Anrufbeantworter in Netz, XP-000861610, 1998.
General Recommendations onTelephone Switching and Signalling-Introduction to Intelligent Network Capability Set 1, International Telecommunication Union, XP-002141945, Mar. 1993.
The Belcore and ITU-T Call Model Operations, XP-002141946, 1998.
Transactions in Intelligent Networks, XP-002141947, 1998.

Voice Services on the Intelligent Network: Intelligent Peripherals and Service Nodes, F. Bosco, XP-000607359, Aug. 1992.

James Carlton Bedingfield, Non Final Office Action, mailed Apr. 1, 2003, filed Feb. 25, 2000 U.S. Appl. No. 09/513,005.

James Carlton Bedingfield, Final Office Action, mailed Jan. 28, 2004, filed Feb. 25, 2000 U.S. Appl. No. 09/513,005.

James Carlton Bedingfield, Non Final Office Action, mailed Jul. 1, 2004, filed Feb. 25, 2000 U.S. Appl. No. 09/513,005.

James Carlton Bedingfield, Notice of Allowance and Fees, mailed Aug. 25, 2004, filed Feb. 25, 2000 U.S. Appl. No. 09/513,005.

Gao et al., Non Final Office Action, mailed Mar. 24, 2003, filed Sep. 3, 2002 U.S. Appl. No. 10/232,749.

Gao et al., Final Office Action, mailed Jul. 11, 2003, filed Sep. 3, 2002 U.S. Appl. No. 10/232,749.

Gao et al., Notice of Allowance and Fees, mailed Oct. 17, 2003, filed Sep. 3, 2002 U.S. Appl. No. 10/232,749.

Royce D. Jordan Jr., Requirement for Restriction/Election, mailed Sep. 9, 2004, filed Mar. 14, 2003 U.S. Appl. No. 10/097,278.

Royce D. Jordan Jr., Non Final Office Action, mailed Jan. 14, 2005, filed Mar. 14, 2003 U.S. Appl. No. 10/097,278.

Royce D. Jordan, Jr., Final Office Action, mailed Jul. 14, 2005, filed Mar. 14, 2002 U.S. Appl. No. 10/097,278.

Royce D. Jordan, Jr., Non final Office Action, mailed Dec. 5, 2005, filed Mar. 14, 2002 U.S. Appl. No. 10/097,278.

Royce D. Jordan, Jr., Examiners interview, mailed Jan. 4, 2006, filed Mar. 14, 2002 U.S. Appl. No. 10/097,278.

Royce D. Jordan, Jr., Final Office Action, mailed May 18, 2006, filed Mar. 14, 2002 U.S. Appl. No. 10/097,278.

Royce D. Jordan, Jr., Notice of Allowance and Fees, mailed Aug. 22, 2006, filed Mar. 14, 2002 U.S. Appl. No. 10/097,278.

Royce D. Jordan, Jr., Examiner Interview Summary, mailed Oct. 20, 2005, filed Jan. 4, 2005 U.S. Appl. No. 11/028,973.

Royce D. Jordan, Jr., Final Office Action, mailed Jan. 10, 2006, filed Jan. 4, 2005 U.S. Appl. No. 11/028,973.

Royce D. Jordan, Jr., Non Final Office Action, mailed Jun. 28, 2006, filed Jan. 4, 2005 U.S. Appl. No. 11/028,973.

Royce D. Jordan, Jr., Non Final Office Action, mailed Jul. 14, 2005, filed Jan. 4, 2005 U.S. Appl. No. 11/028,973.

Royce D. Jordan, Jr., Final Office Action, mailed Dec. 13, 2006, filed Jan. 4, 2005 U.S. Appl. No. 11/028,973.

Royce D. Jordan, Jr., Examiner Interview Summary, mailed Feb. 22, 2007, filed Jan. 4, 2005 U.S. Appl. No. 11/028,973.

Royce D. Jordan, Jr., Non Final Office Action, mailed Mar. 30, 2007, filed Jan. 4, 2005 U.S. Appl. No. 11/028,973.

James Carlton Bedingfield, Non Final Office Action, mailed Feb. 10, 2006, filed Feb. 13, 2003 U.S. Appl. No. 10/369,445.

James Carlton Bedingfield, Final Office Action, mailed Jul. 24, 2006, filed Feb. 13, 2003 U.S. Appl. No. 10/369,445.

James Carlton Bedingfield, Notice of Allowance and Fees, mailed Jun. 1, 2007, filed Feb. 13, 2003 U.S. Appl. No. 10/369,445.

Maria Adamczyk, Non Final Office Action, mailed Apr. 22, 2005, filed Jan. 31, 2003 U.S. Appl. No. 10/355,931.

Maria Adamczyk, Final Office Action, mailed Nov. 22, 2005, filed Jan. 31, 2003 U.S. Appl. No. 10/355,931.

Maria Adamczyk, Non Final Office Action, mailed Aug. 10, 2006, filed Jan. 31, 2003 U.S. Appl. No. 10/355,931.

Maria Adamczyk, Notice of Allowance and Fees, mailed Feb. 7, 2007, filed Jan. 31, 2003 U.S. Appl. No. 10/355,931.

Mary Arnoff, Non Final Office Action, mailed Mar. 24, 2006, filed May 5, 2004 U.S. Appl. No. 10/839,535.

Mary Arnoff, Final Office Action, mailed Apr. 23, 2007, filed May 5, 2004 U.S. Appl. No. 10/839,535.

Jordan; Notice of Allowance mailed Jun. 10, 2011 for U.S. Appl. No. 11/610,769, filed Dec. 14, 2006.

\* cited by examiner

VOICE MAIL NOTIFICATION USING INSTANT MESSAGING

CROSS-REFERENCE TO RELATED APPLICATIONS

This application is a continuation of application Ser. No. 10/759,165, filed Jan. 20, 2004, which is a continuation of application Ser. No. 10/232,749, filed Sep. 3, 2002, which are incorporated herein by reference as if set forth in their entireties.

TECHNICAL FIELD

The present invention relates generally to the field of voicemail message management and, more particularly, to systems and methods for notifying an instant messaging client of messages received at a voicemail server.

BACKGROUND OF THE INVENTION

Most, if not all, telephone users have at least one voice mailbox in which callers can leave messages when the users are unavailable to answer calls. Voicemails are typically retrieved by the users in a number of ways. For example, using a telephone set in her office, a voicemail user who returns from a lunch break can hear voicemails that were left at her voice mailbox while she was at lunch. Alternatively, the voicemail user could remotely dial in (e.g., from her home or while she is out of town) to her voice mailbox to retrieve the voicemail messages. Regardless of the method used, the voicemail user must first access her voicemail server to determine whether or not a new message has been stored in her voice mailbox since the last time she checked the mailbox. This can be inconvenient to the user.

Accordingly, there is a need for a system and method that would notify the user instantaneously when a voicemail has arrived at her voice mailbox.

SUMMARY OF THE INVENTION

The present invention is a system and method that provides enhanced notification of messages received by a voicemail server using instant messaging. In a preferred embodiment, the invention provides an enhanced notification server that works with a voicemail server and an instant messaging presence server to notify an instant messaging client of messages received at the voicemail server. When a new message, e.g., a voicemail, a fax message, or the like, intended for a subscriber of a voice mailbox is received, the voicemail server sends a notification to the enhanced notification server. The enhanced notification server then queries the instant messaging presence server to determine whether the voice mailbox subscriber (who is also the instant messaging client) is available. "Available" means the instant messaging client is online, engaged in an instant messaging session, or otherwise logged on to the instant messaging presence server. If the instant messaging client is available, the enhanced notification server forwards the notification to the instant messaging client. Preferably, forwarding of the notification to the instant messaging client (the voice mailbox subscriber) is accomplished via the instant messaging presence server. The enhanced notification server queues the notification for a later delivery if the instant messaging client is not available.

In another preferred embodiment, the invention provides a method for notifying an instant messaging client of messages received by a voicemail server of which the instant messaging client is a voice mailbox subscriber. The methods include the following steps. First, when the voicemail server receives a message, e.g., a voicemail, a fax message, and the like, which is intended for the instant messaging client, the voicemail server sends a notification to an enhanced notification server. The notification indicates that a new message is available on the voicemail server for retrieval. The enhanced notification server then queries an instant messaging presence server whether the instant messaging client is available. If the voice mailbox subscriber (who is also the instant messaging client) is available, the enhanced notification server forwards the notification to the instant messaging presence server, which in turns forwards the notification to the instant messaging client using known instant messaging technologies.

In other embodiments, the invention can be adapted to forward the incoming message to the voice mailbox subscriber via instant messaging.

DETAILED DESCRIPTION OF THE INVENTION

Figure 1:
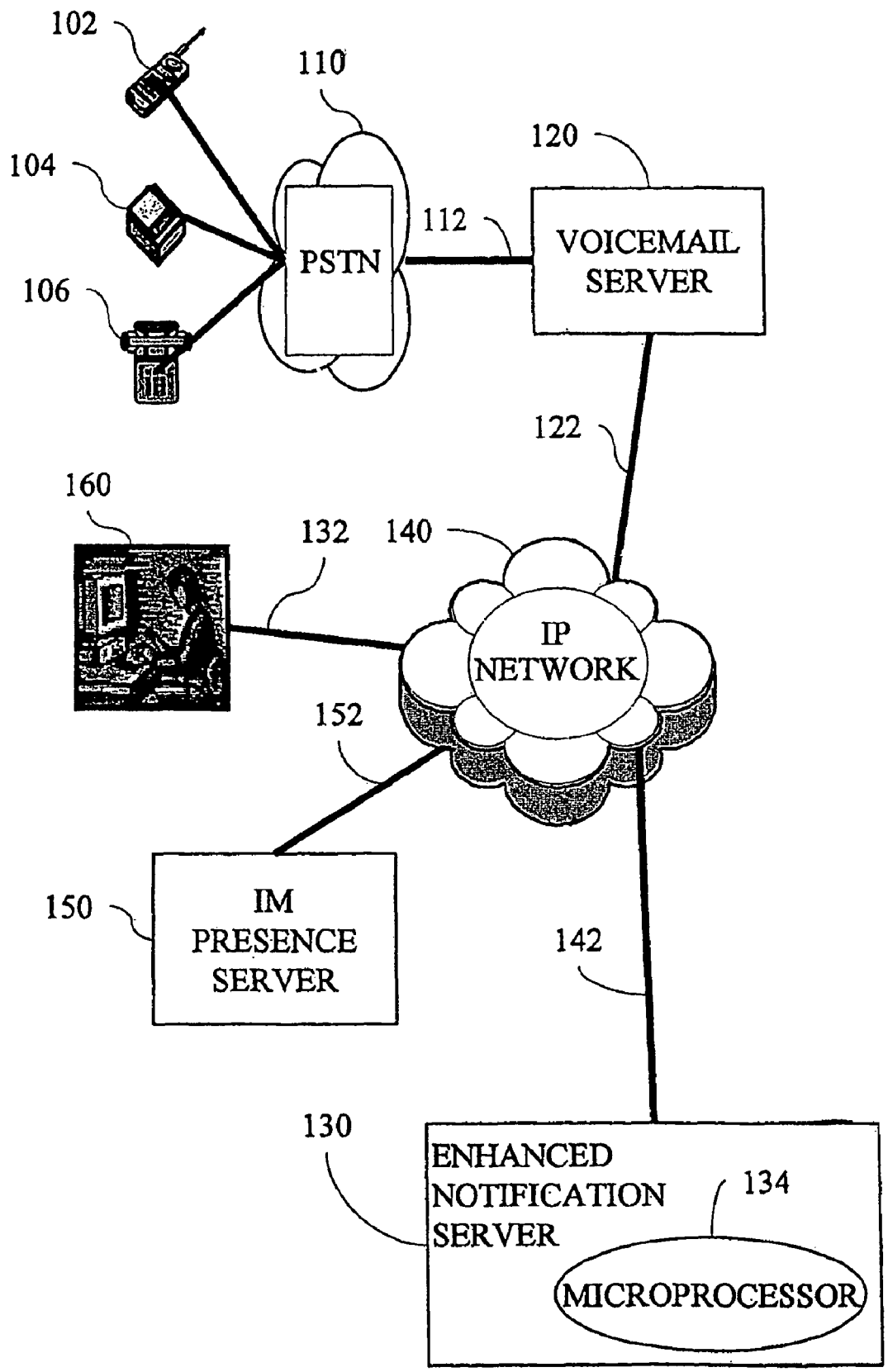
FIG. 1 is a schematic diagram showing the system architecture used in a preferred embodiment of the invention.

FIG. 1 is a schematic diagram showing the system architecture used in a preferred embodiment of the invention. PSTN 110, voicemail (VM) server 120, IP network 140, and instant messaging (IM) presence server 150 are known elements in the art. As shown in FIG. 1, PSTN 110 is accessible to users via one or more of wireless telephone 102, fax machine 104, and wireline telephone 106. Although not indicated in FIG. 1, PSTN 100 can be accessible to other telecommunications devices including, for example, a computer with a modem, an interactive pager, a personal digital assistant, and the like.

As known in the art, voicemail server 120 can receive voicemail, fax messages, and the like from various sources including, for example, PSTN 110, through link 112. Voicemail server 120 is in communication with IP network 140 via link 122. Voicemail server 120 and IP network 140 can communicate with each other using known protocols, including, for example, TCP/IP.

Preferably, voicemail server 120 is adapted to provide traditional voicemail features as well as new features. Voicemail server 120 preferably includes a profile for each of its voice mailbox subscribers regarding how notification of incoming messages should be performed. Preferably, voicemail server 120 is adapted to initiate the notification by communicating with enhanced notification server 130. Communications between voicemail server 120 and enhanced notification server 130 can be accomplished via IP network 140 and links 122 and 142.

As known in the art, there are a number of different protocols used by different instant messaging service providers. For example, each of AOL, Yahoo!, and MSN uses its own protocol for its instant messaging service. Accordingly, communication sessions between enhanced notification server 130 and instant messaging presence server 150 is facilitated by the appropriate protocol associated with instant messaging presence 150.

Preferably, enhanced notification server 130 includes microprocessor 134. Microprocessor 134 is preferably adapted to provide a number of functionalities. For example, in a preferred embodiment of the invention, enhanced notification server 130 can query instant messaging presence server 150 whether instant messaging client 160 is available. For example, enhanced notification server 130 can query instant messaging presence server 150 whether instant messaging client 160 (voicemail subscriber) has an active instant messaging session. If instant messaging client 160 is available, enhanced notification server 130 forwards the notification to instant messaging client 160. The notification is preferably forwarded via IP network 140 and instant messaging presence server 150 through links 142, 152, and 132.

Figure 2:
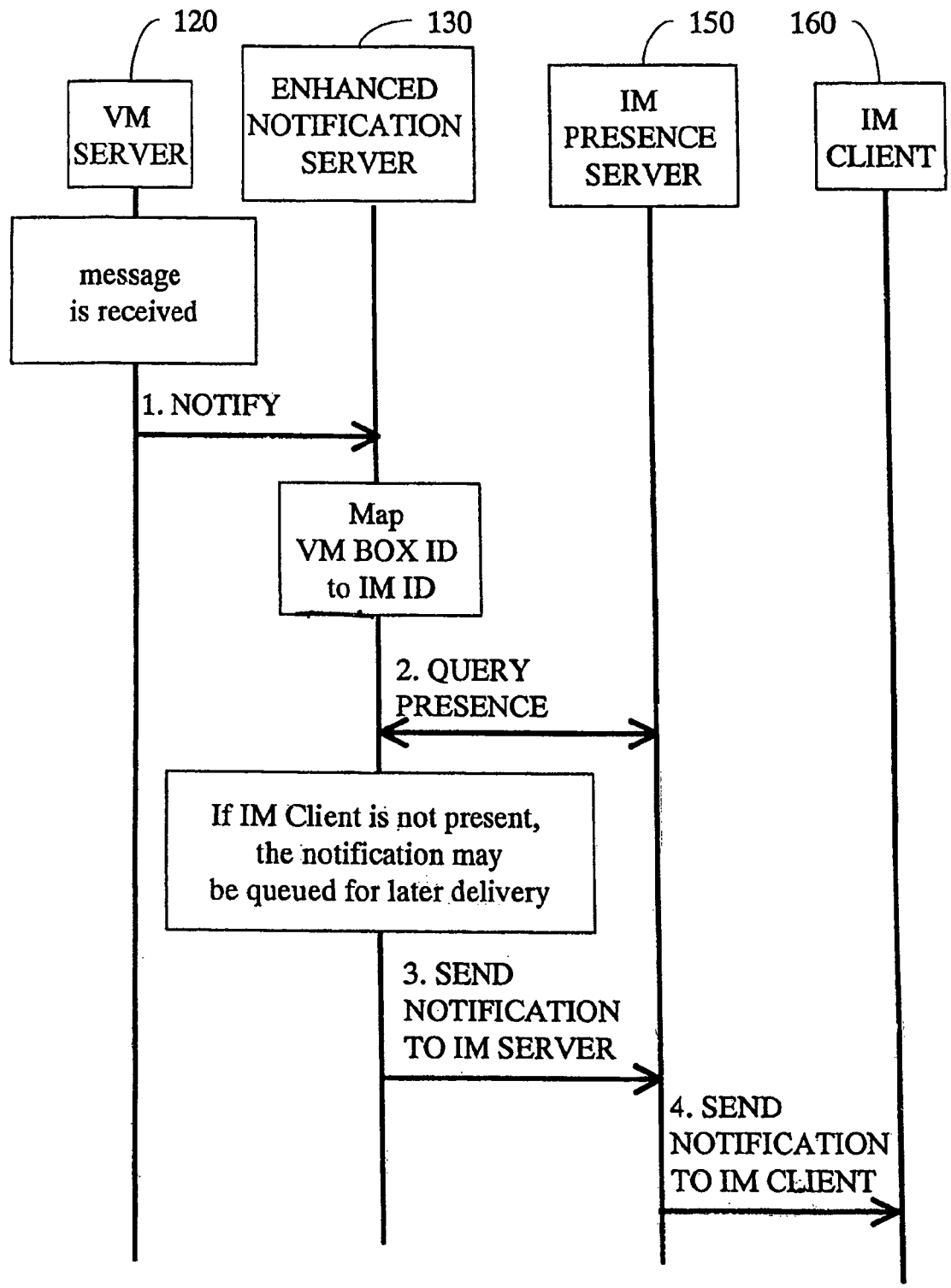
FIG. 2 is a schematic diagram summarizing the sequence of activities of a preferred embodiment that involves a voicemail server, an enhanced notification server, an instant messaging presence server, and an instant messaging client.

FIG. 2 is a schematic diagram summarizing the sequence of activities involving voicemail server 120, enhanced notification server 130, instant messaging presence server 150, and instant messaging client 160. As shown in FIG. 2, communications between enhanced notification server 130 and instant messaging presence server 150 include multiple queries and responses regarding the presence or availability of instant messaging client 160. Additional details regarding FIG. 2 are explained in conjunction with the description of FIG. 3 below.

Figure 3:
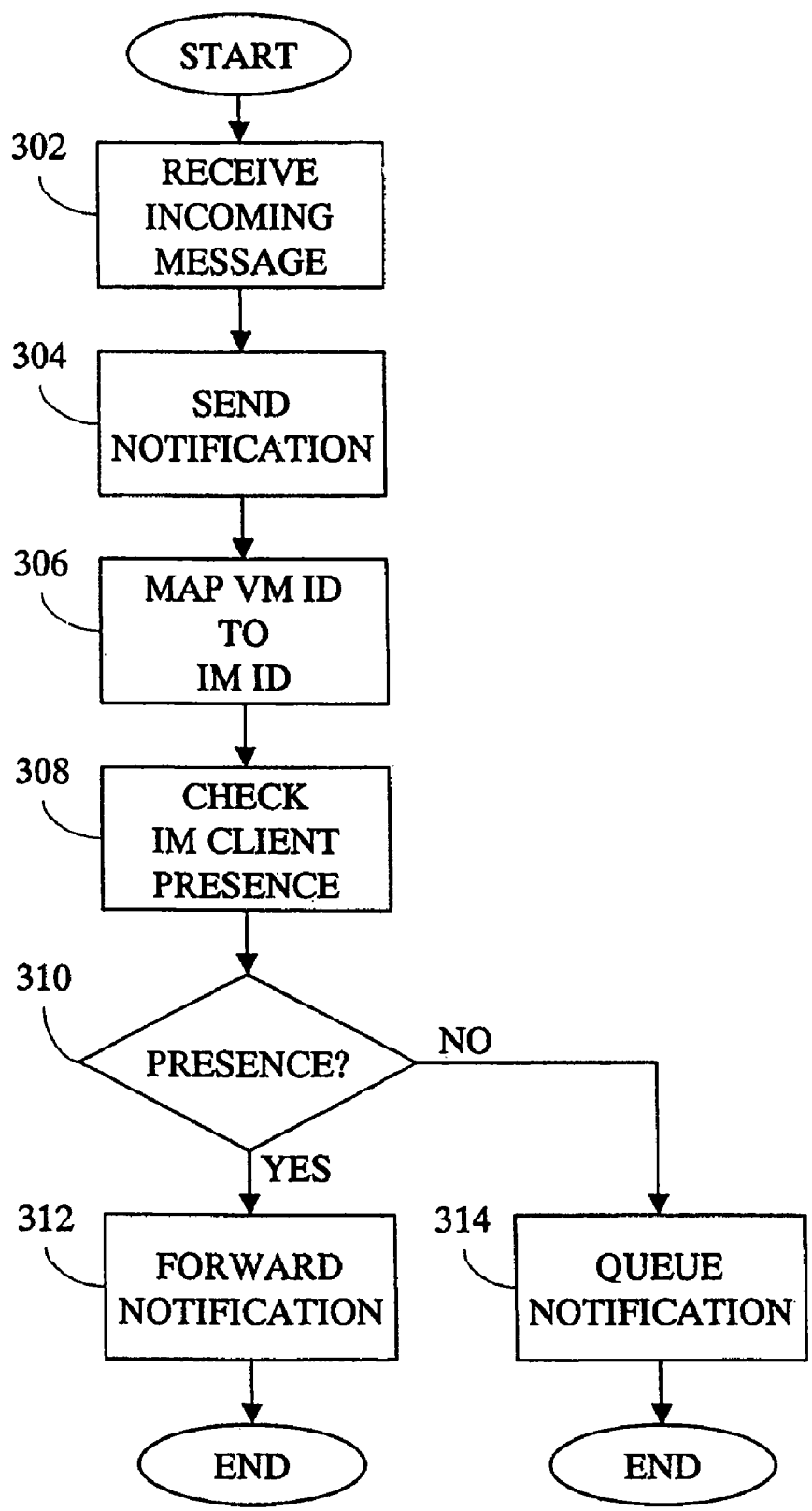
FIG. 3 is a flowchart showing exemplary steps involved in implementing a preferred embodiment of the invention.

FIG. 3 is a flowchart showing exemplary steps involved in implementing a preferred embodiment of the invention.

In step 302, an incoming message (e.g., voice, fax, or the like) intended for a voice mailbox subscriber is received at voicemail server 120.

In step 304, voicemail server 120 sends a notification to enhanced notification server 130. The notification may include a number of attributes associated with the incoming message including, for example, the date and time on which the incoming message was received, the identity of the sender of the incoming message, the length (or size) of the incoming message, and so on. The notification preferably includes a voice mailbox identification of the voice mailbox subscriber. The voice mailbox identification can be, for example, a telephone number associated with the voice mailbox subscriber.

In step 306, enhanced notification server 130 maps the voice mailbox identification (VM ID) to an instant messaging identification (IM ID). Note that both the VM ID and the IM ID belong to a common entity. The common entity is instant messaging client 160 that is also the voice mailbox subscriber for which the incoming message is intended. The IM ID can be, for example, an alphanumeric character string associated with instant messaging client 160.

In step 308, enhanced notification server 130 checks the presence status or availability of instant messaging client 160. Preferably, the IM ID is utilized in this step.

In step 310, if it is determined that instant messaging client 160 is present or available, the process goes to step 312; otherwise, the process goes to step 314.

In step 312, the notification is forwarded by enhanced notification server 130 to instant messaging client 160. Preferably, the notification is forwarded via instant messaging presence server 150.

In step 314, the notification is queued at enhanced notification server 130 for a later delivery until instant messaging clients 60 is available.

Figure 4:
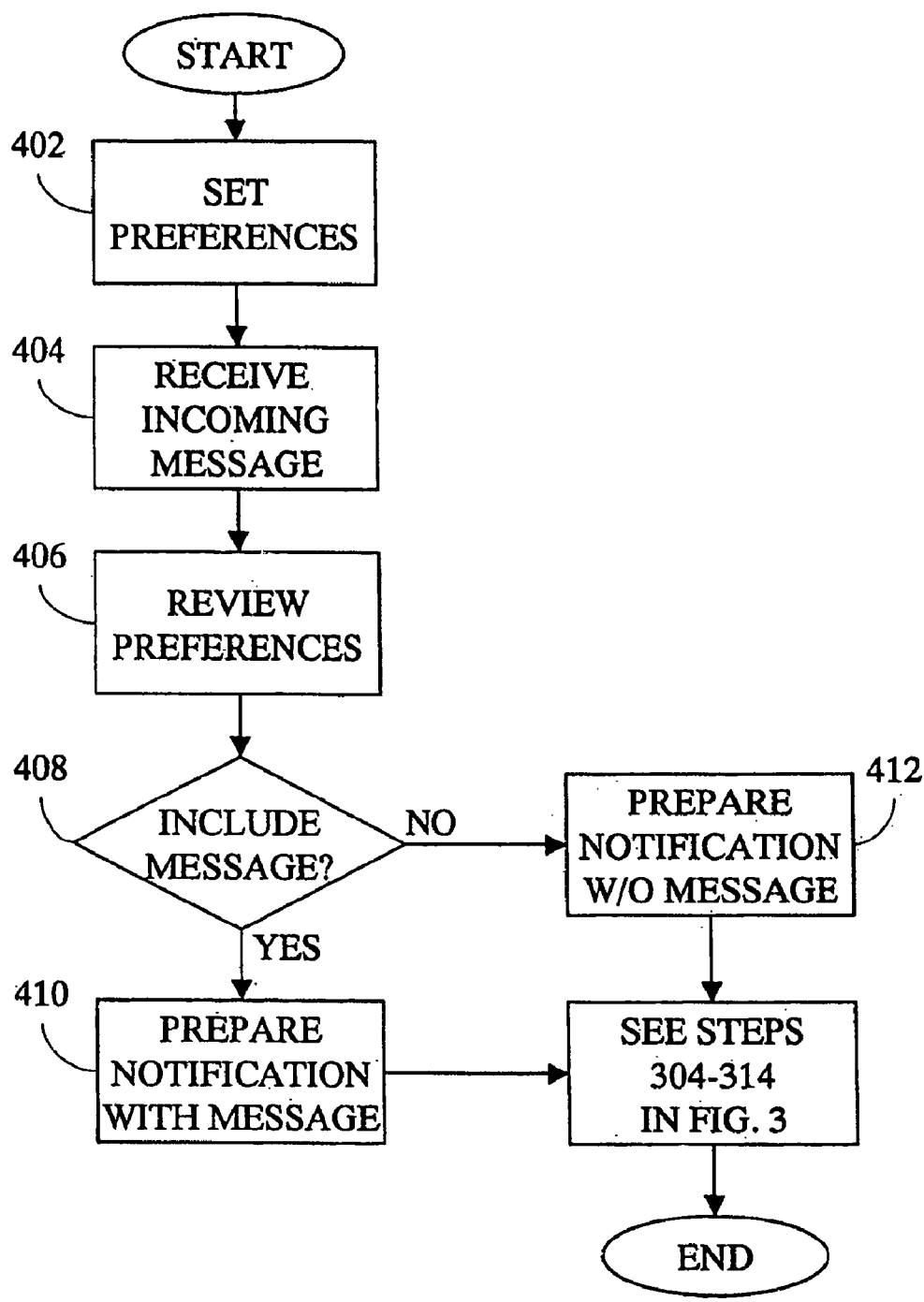
FIG. 4 is a flowchart showing exemplary steps involved in implementing another preferred embodiment of the invention.

FIG. 4 is a flowchart showing exemplary steps involved in implementing another preferred embodiment of the invention. In this embodiment, the invention enables a user of the invention, e.g., the voice mailbox subscriber or instant messaging client 160 discussed above, to receive the incoming message along with the notification. In this embodiment, voicemail server 120 is adapted to attach the incoming message to the notification.

In step 402, preferences are set. The preferences may include, for example, the user's desire to receive the incoming message in addition to the notification via instant messaging. Preferences are stored in a location that is accessible to voicemail server 120.

In step 404, voicemail server 120 receives an incoming message.

In step 406, voicemail server 120 reviews the preferences set in step 402.

In step 408, if the preferences have been set such a way that the user does not wish to have the incoming message attached to a notification, the process goes to step 412; otherwise, the process goes to step 410.

In step 410, voicemail server 120 prepares a notification with the incoming message attached to the notification.

In step 412, voicemail server 120 prepares a notification without the incoming message attached to the notification.

Following one of steps 410 and 412, steps generally similar to steps 304 through 314 shown in FIG. 3 and discussed above may be used to implement this embodiment.

Figure 5:
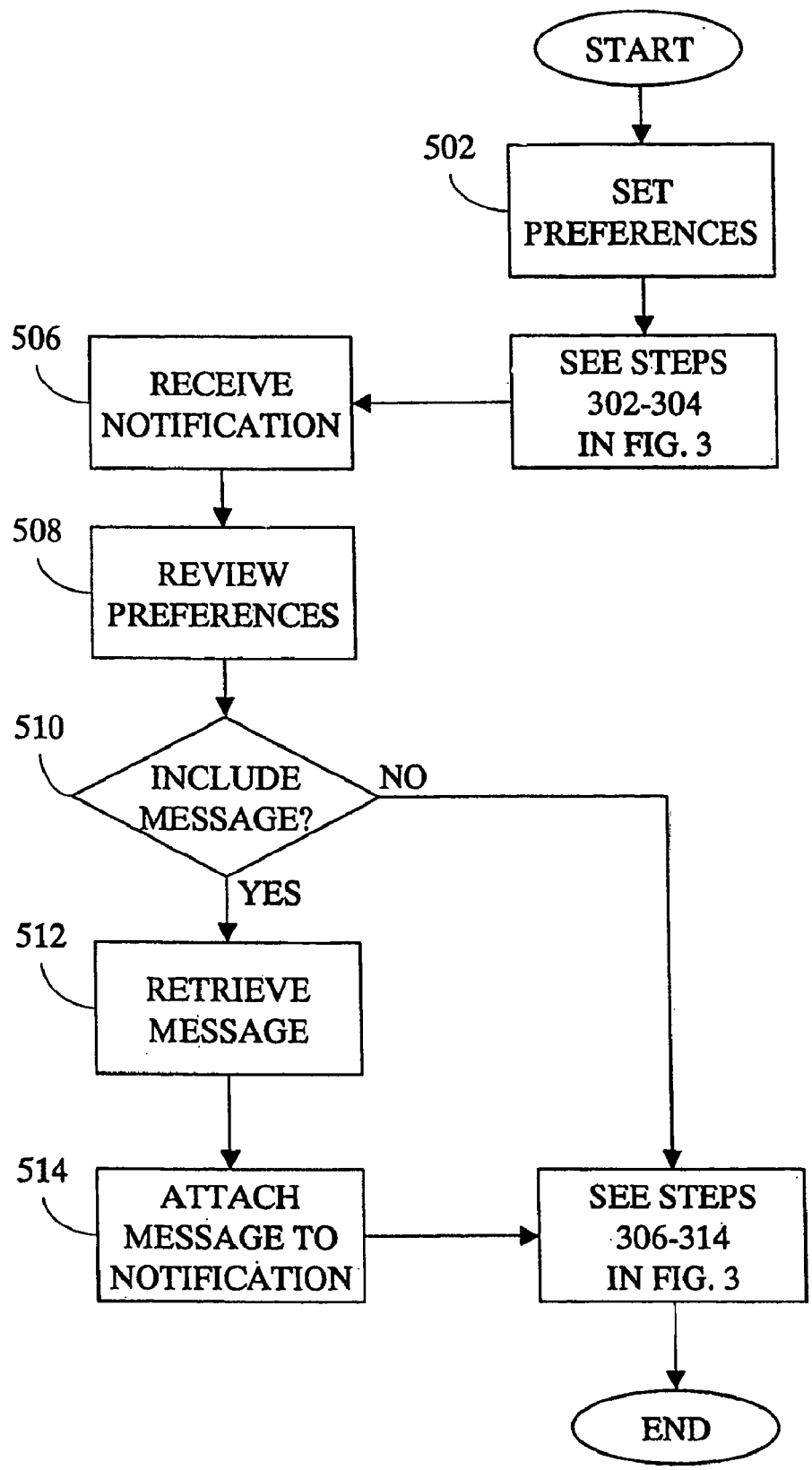
FIG. 5 is a flowchart showing exemplary steps involved in implementing another preferred embodiment of the invention.

FIG. 5 is a flowchart showing exemplary steps involved in implementing another preferred embodiment of the invention. In this embodiment, the invention enables a user of the invention to receive the incoming message along with the notification. In this embodiment, enhanced notification server 130 is adapted to retrieve the incoming message from voicemail server 120 and attach the incoming message to the notification.

In step 502, preferences are set. The preferences may include, for example, the user's desire to receive the incoming message in addition to the notification via instant messaging. Preferences are stored in a location that is accessible to enhanced notification server 130.

After step 502 but before step 506, steps generally similar to steps 302 through 304 shown in FIG. 3 and discussed above may be used to implement this invention.

In step 506, enhanced notification server 130 receives a notification from voicemail server 120 that an incoming message has been received by voicemail server 120.

In step 508, enhanced notification server 130 reviews the preferences set in step 502.

In step 510, if the preferences have been set such a way that the user does not wish to have the incoming message attached to the notification via instant messaging, the process goes to steps that are generally similar to steps 306 through 314 shown in FIG. 3 and described above. Otherwise, the process goes to step 512.

In step 512, enhanced notification server 130 communicates with voicemail server 120 to retrieve the incoming message.

In step 514, enhanced notification server 130 attaches the incoming message to the notification.

Following step 514, steps generally similar to steps 306 through 314 shown in FIG. 3 and discussed above may be used to implement this embodiment.

Figure 6:
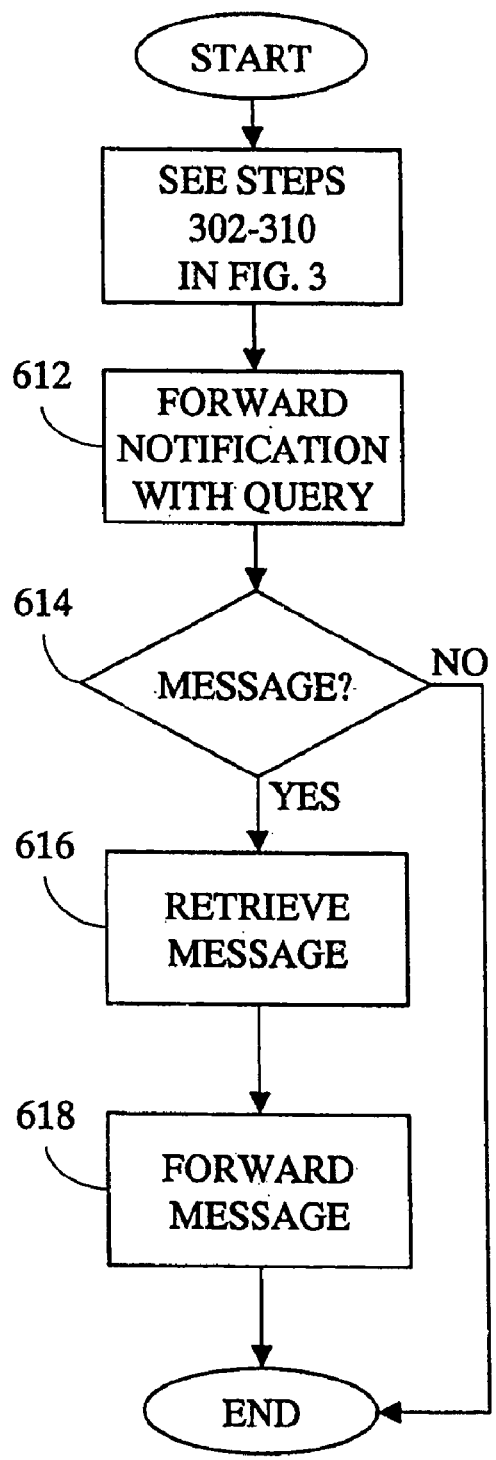
FIG. 6 is a flowchart showing exemplary steps involved in implementing another preferred embodiment of the invention.

FIG. 6 is a flowchart showing exemplary steps involved in implementing another preferred embodiment of the invention. In this embodiment, the invention enables a user of the invention to receive the incoming message via instant messaging after reviewing the notification. In this embodiment, enhanced notification server 130 is adapted to retrieve the incoming message from voicemail server 120 after receiving a respond from the user that the user wishes to receive the incoming message via instant messaging.

Steps similar to steps 302 through 310 shown in FIG. 3 and discussed above may be used to implement this embodiment.

Following step 310, in step 612, enhanced notification server 130 forwards the notification to the user. Here, the notification includes a query whether the user wishes to receive the incoming message via instant messaging.

If in step 614 the user responds with an affirmative answer, the process goes to step 616. Otherwise, the process ends.

In step 616, enhanced notification server 130 communicates with voicemail server 120 to retrieve the incoming message.

In step 618, after the incoming message is received from voicemail server 120, enhanced notification server 130 forwards the incoming message to the user via instant messaging.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

Therefore, at least the following is claimed:

1. A method comprising the steps of:
   receiving a notification from a voicemail server, wherein the notification comprises attributes associated with an incoming message intended for a voice mailbox subscriber of the voicemail server and a voice mailbox identification associated with the voice mailbox subscriber;
   mapping the voice mailbox identification to an instant messaging identification of an instant messaging client, wherein the voice mailbox subscriber and the instant messaging client are a common entity;
   querying a presence of the instant messaging client using the instant messaging identification; and
   forwarding the notification to the instant messaging client if the instant messaging client is available.

2. The method of claim 1, further comprising one or more of the step of extracting the voice mailbox identification from the notification; and the step of queuing the notification at the enhanced notification server for a later delivery if the instant messaging client is not available.

3. The method of claim 1, further comprising the step of attaching the incoming message to the notification.

4. The method of claim 1, wherein the incoming message is one of a voicemail message and a fax message.

5. The method of claim 1, wherein the attributes comprise one or more of an identity of a sender of the incoming message, a date of the incoming message, a time of the incoming message, and a size of the incoming message.

6. The method of claim 1, wherein the voice mailbox identification is a telephone number associated with the voice mailbox subscriber.

7. The method of claim 1, wherein the instant messaging identification is an alphanumeric character string associated with the instant messaging client.

* * * * *